US012655306B2

(12) United States Patent
Farrugia et al.

(10) Patent No.: US 12,655,306 B2
(45) Date of Patent: Jun. 16, 2026

(54) MICA PIGMENT PARTICLES FOR POWDER COATING APPLICATIONS

(71) Applicant: Xerox Corporation, Norwalk, CT (US)

(72) Inventors: Valerie Farrugia, Oakville (CA); Sandra Gardner, Oakville (CA)

(73) Assignee: Genesee Valley Innovations, LLC, Santa Clara, CA (US)

( * ) Notice: Subject to any disclaimer, the term of this patent is extended or adjusted under 35 U.S.C. 154(b) by 329 days.

(21) Appl. No.: 16/292,257

(22) Filed: Mar. 4, 2019

(65) Prior Publication Data

US 2020/0283642 A1 Sep. 10, 2020

(51) Int. Cl.
| | |
|---|---|
| *C09D 5/03* | (2006.01) |
| *B05D 1/00* | (2006.01) |
| *B05D 3/00* | (2006.01) |
| *C09D 7/40* | (2018.01) |
| *C09D 7/65* | (2018.01) |
| *C09D 167/02* | (2006.01) |

(52) U.S. Cl.
CPC .............. *C09D 5/036* (2013.01); *B05D 1/007* (2013.01); *B05D 3/007* (2013.01); *C09D 5/035* (2013.01); *C09D 7/69* (2018.01); *C09D 7/70* (2018.01); *C09D 167/02* (2013.01)

(58) Field of Classification Search
CPC .......... C09D 5/035; C09D 5/036; C09D 7/69; C09D 7/70; C09D 167/02; B05D 1/007; B05D 3/007
See application file for complete search history.

(56) References Cited

U.S. PATENT DOCUMENTS

| | | | |
|---|---|---|---|
| 5,025,041 | A | 6/1991 | Pfenninger et al. |
| 5,116,664 | A | 5/1992 | Kimura et al. |
| 5,212,263 | A | 5/1993 | Schreffler et al. |
| 5,714,295 | A * | 2/1998 | Wilson ............... G03G 9/09775 |
| | | | 430/108.2 |
| 6,541,544 | B1 | 4/2003 | Hart et al. |
| 7,425,398 | B2 | 9/2008 | Nosella et al. |
| 7,737,197 | B2 | 6/2010 | Ferencz |
| 7,857,901 | B2 | 12/2010 | Carlini et al. |
| 7,883,574 | B2 | 2/2011 | Carlini et al. |
| 7,938,903 | B2 | 5/2011 | Carlini et al. |
| 8,076,048 | B2 | 12/2011 | Sacripante |
| 8,163,459 | B2 | 4/2012 | Farrugia et al. |
| 8,247,157 | B2 | 8/2012 | Nosella et al. |
| 8,461,351 | B2 | 6/2013 | Carlini et al. |

(Continued)

FOREIGN PATENT DOCUMENTS

| | | |
|---|---|---|
| EP | 3 279 741 A1 | 2/2018 |

OTHER PUBLICATIONS

Dietrich, R.V. "Mica" (Jan. 20, 2023) Encyclopaedia Britanica, Inc. https:/www.britannica.com/science/mica (Year: 2023).*

(Continued)

*Primary Examiner* — Amber R Orlando
*Assistant Examiner* — Anastasia A. Kuvayskaya
(74) *Attorney, Agent, or Firm* — KPPB LAW; Kermit D. Lopez; Luis M. Ortiz

(57) ABSTRACT

A mica-containing pigment composition having spherical particles composed primarily of polyester and mica for use in electrostatic powder coating applications. The particles are produced by precipitation under shear stress from a solution containing mica and a polyester resin.

7 Claims, 5 Drawing Sheets

(56) References Cited

U.S. PATENT DOCUMENTS

| | | | |
|---|---|---|---|
| 8,735,037 B2 * | 5/2014 | Yamashita ........... | G03G 9/0806 |
| | | | 430/109.4 |
| 8,828,637 B2 | 9/2014 | Zhou et al. | |
| 2004/0011253 A1 * | 1/2004 | Noguchi ................... | A61K 8/19 |
| | | | 106/401 |
| 2004/0146641 A1 * | 7/2004 | Hobbs ...................... | B01J 13/14 |
| | | | 428/402 |
| 2006/0034879 A1 | 2/2006 | Miyazaki et al. | |
| 2006/0040194 A1 * | 2/2006 | Sugiura .............. | G03G 9/08782 |
| | | | 430/108.4 |
| 2009/0111040 A1 | 4/2009 | Veregin et al. | |
| 2012/0015292 A1 | 1/2012 | Andaya et al. | |
| 2013/0295504 A1 * | 11/2013 | Tyagi ................. | G03G 9/09725 |
| | | | 430/137.21 |
| 2014/0018508 A1 * | 1/2014 | Masubuchi ......... | C08F 290/068 |
| | | | 526/279 |
| 2018/0022043 A1 | 1/2018 | Keoshkerian et al. | |
| 2018/0064631 A1 * | 3/2018 | Kurotani .................. | A61Q 1/10 |

OTHER PUBLICATIONS

Definition of the term 'gloss'. Merriam Webster's Collegiate Dictionary 10th Ed. (1997) (p. 497) (Year: 1997).*

DSM Composite Resins. Product Data Sheet for Atlac 382 Powder. https://baltazarkompozyty.pl/katalog-produktainmenu-26?format=raw&task=download&fid=157 (Sep. 11, 2020) (Year: 2020).*

CNESST. Toxicology Report for Atlac Resin No. 382—Synonym of CAS No. 39382-25-27. https://reptox-cnesst-gouv-qc-ca.translate.goog/en/Pages/fiche-complete.aspx?langue=a&no_produit=854158 &no_seq=5&_x_tr_sl=fr&_x_tr_tl=en&_x_tr_hl=en&_x_tr_pto= sc (Jul. 19, 2023) (Year: 2023).*

European Search Report, European Application No. 20160803.1-1105, Dated Jun. 25, 2020.

Barretta, S. et al. "Size, Shape and Flow of powders for use in Selective Laser Sintering (SLS)", 6 pages, 2013.

Sysmex FPIA3-3000, "Flow particle image analysis of size and shape", 2010.

Intech Services Inc., "Composition of Power Coatings", https://intechservices.com/intech-insider-blog/composition-of-powder-coatings/?gclid=EAlalQobChMlv5yX9Pa04glVicpkCh13sAqeEAAYASAAEglJavD_BWE, 3 pages, Feb. 12, 2015.

PCI, "Metallic Pigments for Power Coatings", https://www.pcimag.com/articles/83848-metallic-pigments-for-powder-coatings, 5 pages, Jan. 1, 2003.

Teikoku Printing Inks Mfg. Co. Ltd., "Pearl ink (Pearl Screen Ink)", 3 pages, http://www.teikokuink.com/en/techreport/report/113_tech.html, retrieved from internet May 23, 2019.

Canadian Requisition and Examination Report, Canadian Intellectual Property Office, Canadian Patent Application No. 3,074,132; Apr. 16, 2021.

* cited by examiner

MICA PIGMENT PARTICLES FOR POWDER COATING APPLICATIONS

BACKGROUND

Powder coatings are used in a variety of applications, including in the automotive, construction and furniture industries. Powder coatings contain no liquid solvents and emit only small quantities of volatile organic compounds (VOCs) or hazardous air pollutants (HAPs) when applied and cured on a surface, and are therefore favored over conventional solvent-borne coatings when limiting VOC emissions is desired. In order to provide color to a powder coating, a pigment can be included in the coating material.

One pigment used with powder coatings is mica, a flake-like, lamellar metal-hydrate silicate/aluminosilicate mineral which can be used to add a pearlescent effect to coatings. Mica has been incorporated into powder coatings in a variety of ways, such as by dry blending mica particles with a powder coating material and by bonding mica particles to the particles of a powder coating. In a process referred to as "blitz bonding," mica particles are attached to coarser powder particles of a powder coating to prevent separation of the mica pigment during application of the powder to a surface. However, the crushing of coarser blitz-bonded powder particles during manufacture and use of such coatings can result in loose mica particles in the composition. Loose mica in such blitz-bonded compositions, as well as in dry blended powder coatings, can cause color variation in a coated surface. Unbonded mica flakes also interfere with the application of powder coatings to a surface by tribo or corona powder coating guns, as the electrostatic charge of a coating gun can make such flakes stand on their side instead of lying flat, and can also make the mica flakes adhere together, thereby clogging the powder coating gun.

Another way that mica has been incorporated into powder coatings is by melt extrusion. In this process, mica is mixed with a polymer, melt extruded, and then ground or pulverized to form a pigmented powder coating. The forces of extrusion and grinding, however, can damage the mica pigment and create loose mica pigment in the final composition.

It is desired to provide improved mica-containing powder coatings having the ability to tailor particle size ranges, gloss and other desired properties by use of smaller, more spherical particles. It is also desired to provide mica-containing powder coatings prepared by a more energy efficient process that uses less energy and less steps. It is further desired to provide a process for the preparation of mica-containing powder coatings using a "bottom-up" approach. Moreover, it is desired to provide dramatic, decorative colored powder coatings such as metallic (gold and silver) and pearlescent colors.

SUMMARY

The above desired properties can be obtained with the present powder coating which can include, in embodiments, a binder resin and a metal oxide mica pigment. The coating includes spherical, mica-containing pigment particles formed from a polymer material which has mica flakes incorporated both within and on the outside of the particles. The pigment particles can have a circularity of between about 0.93 and about 0.999 and a geometric size distribution of between about 1.3 and about 2.0.

In order to form such mica-containing pigment particles, mica particles and an amorphous polyester resin are first combined with polymeric stabilizer, such as a water-soluble polymer. The polyester resin and polymeric stabilizer are then dissolved into a water-miscible organic solvent together with the mica particles, forming a fluid mixture that includes the mica particles. A polar solvent is added to this fluid mixture at a predetermined rate, and the pigment particles precipitate from this mixture. The precipitated pigment particles are then collected.

The pigment particles can be used as a powder coating in order to form a colored coating on a substrate. The pigment particles are applied to a substrate surface with an electrostatic powder coating applicator, for example, and are then cured on the surface in order to form a colored coating on the substrate.

FIGURES

DESCRIPTION

Definitions

Figure 1:
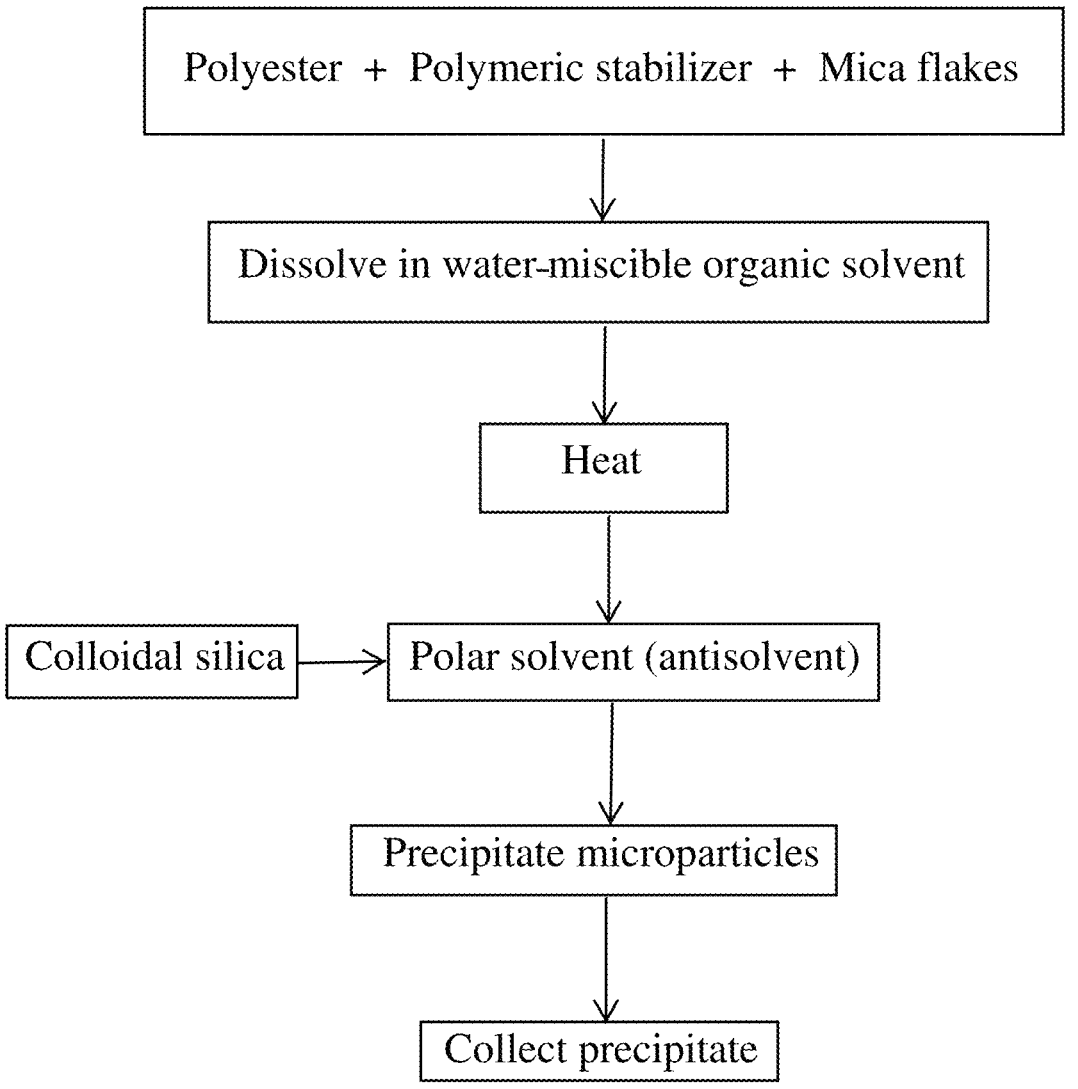
FIG. 1 is a diagram illustrating the steps of an embodiment of the present process for producing a mica-containing pigment composition for powder coating applications.

As used herein, the following terms and variations thereof have the meanings given below, unless a different meaning is clearly intended by the context in which such term is used.

"About" and "approximately" refer to a quantity within 10% of the referenced quantity, unless the circumstances of such usage would indicate a different meaning.

"Aspect ratio" refers to a dimensionless quantity used in image analysis and microscopy to numerically describe the shape of a particle independent of its size. The aspect ratio ($A_R$) of particles in a sample is defined by the following formula:

$$A_R = d_{min}/d_{max}$$

where $d_{max}$ is the largest diameter of a particular particle in a sample $d_{min}$ is the smallest diameter of the particle orthogonal to $d_{max}$. In measurements using imaging, the aspect ratio can be expressed as the ratio of the width (the maximum observed particle dimension) to the height (the minimum observed particle dimension orthogonal to the width) of an image of a particle. An aspect ratio of 1 could thus represent a circle or a square, while a line has an aspect ratio close to 0.

"Circularity" refers to the circumference of a circle of equivalent area divided by the actual perimeter of a central cross-section of a particle. The more spherical a particle is, the closer the circularity is to 1, while the more elongated or rough-edged a particle is, the lower the circularity will be.

"Contemporaneously" refers to the performance of a particular action or step of a process during the same period of time as another action or step, or within a predetermined period of time before or after the other action or step, where performance of the particular action or step within the predetermined period of time does not adversely affect the final result of the process.

"Gloss" refers to the ability of a surface reflect light in a specular (mirror-like) direction. Gloss can be measured in gloss units (GU), i.e. a ratio of reflected to incident light for a measured specimen as compared to the ratio for a standard.

"GSD" refers to geometric standard deviation (GSD).

"Mica" refers to a lamellar, metal-hydrate silicate/aluminosilicate mineral which can be optionally coated with oxides of transition metals such as chrome, cobalt, iron, titanium. Many mica minerals can be described generally by the chemical formula $X_1Y_{2-3}Z_4O_{10}(OH, F)_2$, in which:

X is K, Na, Ca, $H_3O$, $NH_4$ or less commonly Ba, Rb, or Cs;

Y is Al, Mg, or Fe or less commonly Mn, Cr, Ti, Li, V, or Zn; and

Z is generally Si or Al, but also can include $Fe^{3+}$ or Ti.

"Microparticle," for purposes of the present pigment composition, refers generally to particles that have particle sizes in the range of from about 1 to about 500 microns, for example from about 50 to about 300 microns, from about 70 to about 270 microns, or from about 100 to about 220 microns.

"Organic solvent" refers to a liquid material comprising primarily one or more organic compounds.

"Particle size" refers to the diameter of a sphere that has the same volume or surface area as a given particle.

"Powder" refers to a material composed primarily of a number of loose solid particles capable of flowing, such that particles of the powder material are able to move with respect to each other.

"Resin" refers to a noncrystalline polymer material, typically one which is a solid or viscous liquid at room temperature.

"Spherical" refers to a shape which is generally spherical, i.e. to have a central cross section which has a circularity of between about 0.93 and about 0.999. A composition consisting primarily of spherical particles will be understood to be heterogeneous and to include particles which are ovoid or comprise other shapes. Spherical particles of the present composition will also be understood to have mica on their surfaces in some cases, resulting in areas of the surface of such particles with a sheet-like conformation rather than the curvature of a sphere.

"Substrate" refers to an article or layer onto which the present powder coating pigment is applied.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Overview of Mica Pigment Particles and Process of Preparation

The present powder coatings are formed from mica-containing pigment particles composed of a polymer material which has mica flakes incorporated on and within a polymer matrix. These particles have a circularity of between about 0.93 and about 0.999, between about 0.95 and about 0.995, or between about 0.96 and about 0.990, and a geometric size distribution of between about 1.3 and about 2.0. The average particle size of these particles is between about 50 microns and about 250 microns, between about 100 microns and about 200 microns, or between about 125 microns and about 175 microns.

Such spherical mica-containing pigment particles can be created by combining an amorphous polyester resin, a polymeric stabilizer comprising a water-soluble polymer, and mica particles with a water-miscible organic solvent. The polyester resin, polymeric stabilizer, and mica particles can be added together before being placed in contact with the water-miscible organic solvent, or alternatively mica particles can be are added to the water miscible organic solvent before the polyester resin and polymeric stabilizer are placed in contact with the water miscible organic solvent. The polyester resin and polymeric stabilizer are dissolved in the water-miscible organic solvent, and the combined reactants form a first fluid mixture which includes the mica particles.

A second fluid mixture is created when a polar solvent, such as an aqueous solution, is added to the first fluid mixture at a predetermined rate. The second fluid mixture can be heated to a temperature of between about 75° C. and about 95° C. Spherical pigment particles precipitate out of the second fluid mixture, and the precipitated pigment particles are then collected for use in powder coating applications. In order to catalyze the precipitation of the pigment particles, colloidal silica can be added to the second fluid mixture, or alternatively can be added to the first fluid mixture before the addition of the polar solvent solution to the first fluid mixture.

Mica having a particle size of between about 5 microns and about 100 microns can be used in this process, and can be present in the precipitated particles in amounts of between about 2% and about 60% by weight based on the total weight of the pigment particles. The polymeric stabilizer can be any of polyvinyl acetate, poly(methyl methacrylate), poly(acrylonitrile), poly(dimethylsiloxane), polyvinyl chloride, polyethylene, polypropylene), poly(lauryl methacrylate), poly(oxyethylene), poly(acrylamide), poly(vinyl alcohol), poly(acrylic acid), poly(methacrylic acid), polyvinyl pyrrolidone), polyethylene imine), poly(vinyl methyl ether), poly(4-vinylpyridine), poly(12-hydroxystearic acid), poly(isobutylene), cis-1:4-poly(isoprene), carboxymethyl cellulose, gelatin, polysorbate 80, polysorbate 20, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer, polyvinyl acetate phthalate, cellulose acetate phthalate, and combinations thereof.

The polyester used in the present process can have a glass transition temperature of between about 45° C. and about 75° C., and can be any of poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. The water miscible organic solvent can be any of dimethyl acetamide, acetic acid, diethylene glycol dimethyl ether, dimethyl formamide, 1,4-dioxane, ethylene glycol, hexamethyl phosphoramide, hexamethyl phosphorous triamide, pyridine, water, and combinations thereof.

The mica-containing pigment particles can be applied as a powder coating to a substrate surface with an electrostatic powder coating applicator using tribo or corona charging, for example. The applied powder is then cured on the surface in order to form a colored coating on the substrate.

Materials for Preparation of Mica Pigment

A process for preparing the present mica-containing pigment composition is generally described in FIG. 1. This process involves the creation of a first solution by dissolving a polyester resin and a polymeric stabilizer in a water-miscible organic solvent together with mica flakes, and then adding a polar solvent as an antisolvent to precipitate the particles of the mica pigment.

Mica

The optical properties of the present mica-containing pigment composition are primarily provided by flakes of natural or artificially synthesized mica. Mica flakes can be treated with transparent metal oxides that have a high reflection value, such as oxides of transition metals including chromium, cobalt, iron, titanium, and similar metals, for example with metal oxides having a high reflection value such as $TiO2$, $Fe_2O_3$, $Cr_2O_3$, and the like in order to provide a mica material which imparts the characteristic luster of a pearlescent pigment. The color of mica flakes having a metal oxide coating can be controlled by applying different thicknesses of a metal oxide material to the mica flakes. For example, a mica particle with a metal oxide layer having a thickness of from about 40 nm to about 60 nm will reflect silver-colored light, a layer of from about 60 nm to about 80 nm will reflect generally yellow/gold color, a layer of from about 80 nm to about 100 nm will reflect generally red color, a layer of from about 100 nm to about 140 nm will reflect generally blue color, and a layer of from about 120 nm to about 160 nm will reflect generally green color. In embodiments, the powder coating presents a decorative color such as a metallic (gold or silver) or pearlescent color.

Mica particles for use in the present mica pigment typically range from about 5 microns to about 100 microns in size. The size of the mica particles influences the appearance of a surface coated with the present composition, with smaller mica particles providing a less reflective and more opaque finish and larger particles providing a more reflective and transparent finish. Mica particles between about 1 and about 25 microns generally impart a "satin" (glossy, relatively less reflective) finish to a surface, particles between about 10 and about 60 microns generally impart a more reflective finish (having "luster"), and particles between about 20 and about 150 microns can impart an even more reflective finish (having "glitter").

Mica particles also have an effect on the mechanical and electrical properties of the final mica-polymer composite of the present pigment composition. For example, properties such as the stiffness and Young's modulus of the present mica composites increase with an increase in mica loading (mica concentration) (cf., Deshmukh, S. P., Rao, A. C., Gaval, V. R., Joseph, S., Mahanwar, P. A., Journal of Minerals & Materials Characterization & Engineering, Vol. 9, No. 9, pp. 831-844, 2010). On the other hand, elongation at break and tensile strength decrease with mica loading. Dielectric strength and surface resistance also increase with increases in mica loading, making the present composition them more suitable for use in electrical insulation applications.

A variety of mica-containing pigments can be used in the mica component of the present composition. Examples of commercially available pearlescent and metallic mica-containing pigments that can be used in the present process include the following available from Merck & Company, Inc. (Kenilworth, NJ): IRIODIN 300 Gold Pearl, IRIODIN 100 Silver Pearl, TIMIRON Bronze MP60 (D50 volume average particle size, in which 50% of the pigments have a volume size less than the stated size, of 22-37 microns), TIMIRON Copper MP-65 (D50 size of 22-37 microns), COLORONA Oriental Beige (D50 size of 3-10 microns), COLORONA Aborigine Amber (D50 size of 18-25 microns), COLORONA Passion Orange (D50 size of 18-25 microns), COLORONA Bronze Fine (D50 size of 7-14), COLORONA Bronze (D50 size of 18-25 microns), COLORONA Bronze Sparkle (D50 size of 28-42 microns), COLORONA Copper Fine (D50 size of 7-14 microns), COLORONA Copper (D50 size of 18-25), COLORONA Copper Sparkle (D50 size of 25-39 microns), COLORONA Red Brown (D50 size of 18-25 microns), COLORONA Russet (D50 size of 18-25 microns), COLORONA Tibetan Ochre (D50 size of 18-25 microns), COLORONA Sienna Fine (D50 size of 7-14 microns), COLORONA Sienna (D50 size of 18-25 microns), COLORONA Bordeaux (D50 size of 18-25 microns), COLORONA Glitter Bordeaux, and COLORONA Chameleon (D50 size of 18-25 microns).

Other suitable mica pigments available from Merck & Company, Inc. include silver/white pigments such as TIMIRON Super Silk MP-1005 (D50 size of 3-10 microns), TIMIRON Super Sheen MP-1001 (D50 size of 7-14 microns), TIMIRON Super Silver Fine (D50 size of 9-13 microns), TIMIRON Pearl Sheen MP-30 (D50 size of 15-21 microns), TIMIRON Satin MP-11171 (D50 size of 11-20 microns), TIMIRON Ultra Luster MP-111 (D50 size of 18-25 microns), TIMIRON Star Luster MP-111 (D50 size of 18-25 microns), TIMIRON Pearl Flake MP-10 (D50 size of 22-37 microns), TIMIRON Super Silver (D50 size of 17-26 microns), TIMIRON Sparkle MP-47 (D50 size of 28-38 microns), TIMIRON Arctic Silver (D50 size of 19-25 microns), XIRONA Silver (D50 size of 15-22 microns), and RONASTAR Silver (D50 size of 25-45 microns). For bright colors, suitable mica pigments available from Merck & Company, Inc. include COLORONA Carmine Red (D50 size of 10-60 microns, giving a red lustrous effect), COLORONA Magenta (D50 size of 18-25 microns, giving a pink-violet lustrous effect), COLORONA Light Blue (D50 size of 18-25 microns, giving a light blue lustrous effect), COLORONA Dark Blue (D50 size of 18-25 microns, giving a dark blue lustrous effect), COLORONA Majestic Green (D50 size of 18-25 microns, giving a green lustrous color), COLORONA Brilliant Green (D50 size of 19-26 microns, giving a Green-golden lustrous color), COLORONA Egyptian Emerald (D50 size of 18-25 microns, giving a dark green lustrous effect), and COLORONA Patagonian Purple (D50 size of 18-25 microns, giving a purple lustrous effect). Other examples of commercially available mica-containing pigments that can be used in the present process and composition include Diamond Venetian Gold (available from Black Diamond Powder Pigments, St. Augustine, FL) and SYMIC pearlescent pigments, which are based on synthetic mica and are available from ECKART America Corporation (Louisville, KY).

Polyester

The polyester used in the present process for producing a mica-containing pigment composition is a branched or linear amorphous polyester resin. The amorphous polyester resin can be formed by reacting a diol with a diacid in the presence of an optional catalyst. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The diacid or diester can be present, for example, in an amount of from about 40 to about 60 mole percent of the resin, from about 42 to about 52 mole percent of the resin, or from about 45 to about 50 mole percent of the resin.

Examples of diols which can be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis (hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of diol selected can vary, and can be present, for example, in an amount from about 40 to about 60 mole percent of the resin, from about 42 to about 55 mole percent of the resin, or from about 45 to about 53 mole percent of the resin.

Polycondensation catalysts which can be utilized in forming amorphous polyesters for use in the present process include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts can be utilized in amounts of, for example, from about 0.01 mole percent to about 5 mole percent based on the starting diacid or diester used to generate the polyester resin.

Examples of amorphous polyester resins which can be used in the present process include, but are not limited to, unsaturated amorphous polyester resins such as poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. Such unsaturated amorphous polyester resins are disclosed in U.S. Pat. No. 6,063,827.

Alkali sulfonated polyester resins can also be useful in some embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly (propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

The amorphous polyester used in the present process can advantageously have a glass transition temperature of between about 40° C. and about 90° C., or between about 45° C. and about 75° C. The polyester can also have a melt viscosity of from about 10 to about 1,000,000 Pa·s at about 130° C., or from about 20 to about 100,000 Pa·s at about 130° C. The average molecular weight of the amorphous polyester can also be from about 2,000 to about 25,000, as determined by gel permeation chromatography (GPC) using polystyrene standards. Polyester in powder or particulate form is generally used in the present process, though liquid polyester resin can also be used.

Polymeric Stabilizer

The present process for producing a mica-containing pigment also makes use of a water-soluble polymer as a polymeric stabilizer. Non-limiting exemplary polymeric stabilizers include poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly (vinyl alcohol), poly(acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, polysorbate 80 (such as TWEEN 80, available from Millipore Sigma/Merck KGaA, Darmstadt, Germany), polysorbate 20 (such as TWEEN 20, available from Millipore Sigma/Merck KGaA, Darmstadt, Germany), hydroxypropylmethylcellulose, copovidone and polyvinylpyrrolidone, polyethyleneglycols (PEG), polymethacrylates, hypromellose acetate succinate, hypromellose phthalate, a polyvinyl caprolactam-polyvinyl acetate-polyethylene glycol graft copolymer such as SOLU-PLUS (available from BASF, Ludwigshafen, Germany), polyvinyl acetate phthalate, cellulose acetate phthalate, and combinations thereof.

The forgoing polymers include hydrophilic groups in the backbone of the polymer. The hydrophilic groups can be nonionic, anionic, cationic or amphoteric. Such water-soluble polymers can also be either synthetic (produced by the polymerization of monomers synthesized from petroleum or natural gas), semisynthetic (manufactured by chemical derivatization of natural organic materials such as polysaccharides or cellulose), or natural (materials derived from microbial, plant or animal material such as xanthan gum, pectins, dextran, carrageenan, guar, sodium CMC, hylaluronic acid (HA) and albumin).

Polymeric stabilizers are typically surfactants, which lower surface tension, and/or dispersing agents such as polyelectrolytes and some inorganic salts, which stabilize particles by providing a surface charge (electro-static interaction or electro-steric hindrance). Examples of polyelectrolytes include alkali salts of poly(methyl acrylate) and poly(methyl methacrylate), magnesium and calcium carbonate, calcium phosphate, and aluminum chloride. Other stabilizers include water soluble, non-micelle-forming polymers such as methyl and ethyl cellulose, poly(vinyl alcohol), gums, alginates, casein, gelatins, starches and nanoparticles such as talc, silicates, clays and bentonites.

Water-Miscible Organic Solvent

The water-miscible organic solvent for use in the present process can be chosen from solvents known in the art. Such organic solvents can form a homogenous mixture with water without separation of liquid phases (e.g., into polar and nonpolar phases) for a predetermined period of time under the conditions of the present process. For example, the solvent can be selected from the group consisting of an alcohol, dimethyl acetamide, acetic acid, diethylene glycol dimethyl ether, dimethyl formamide, 1,4-dioxane, ethylene glycol, hexamethyl phosphoramide, hexamethyl phosphorous triamide, pyridine, water, and combinations thereof.

The water-miscible organic solvent should remain fluid and preferably has a relatively low viscosity under the conditions of the present process in order to avoid impeding the process. The particular water-miscible organic solvent and the amount of this component used in the present process also should be chosen to avoid precipitation of the solvent. Flory-Huggins interaction parameters can be used to evaluate the compatibility of the polymer(s) and water-miscible organic solvent(s) used in the present process. (see, P. vandeWitte, et al., Phase separation processes in polymer solutions in relation to membrane formation, J. Membrane Science, 117 (1996)).

Antisolvent

A polar solvent is also used in the present process as an antisolvent to induce precipitation of the mica pigment from solution. Deionized water can be used for example, optionally with other additives such as polyvinyl alcohol. Such additives should be chosen to avoid precipitation of the additives or undesirably increasing the viscosity of the liquid mixture. For example, polyvinyl alcohol having a molecular weight of between about 10,000 and about 100,000 can be used as an additive, typically in an amount of between about 0.01% and about 3% by weight, or between about 0.05% and about 2% by weight. Other aqueous solutions or polar solvents can also be used.

Process for Preparing a Mica Pigment

As generally illustrated in FIG. 1, mica particles are combined with polyester and a polymeric stabilizer to form a first fluid mixture in the present process for preparing a mica pigment for use in powder coating applications. Preferably, the polyester is added in solid form, e.g. powdered or pelletized, and is combined with mica pigment particles to form a powder or loose particulate mixture. Alternatively, polyester particles can be first dissolved in a solvent before being combined with mica pigment particles. These components can be combined in a variety of ways, for example prior to contacting them with a water-miscible organic solvent, contemporaneously with the addition of the water-miscible organic solvent, or alternatively mica particles can be pre-slurried in the water-miscible organic solvent and then added to the polyester and polymeric stabilizer components. The fluid mixture is a liquid suspension due to the presence of the mica particles in the mixture.

Mica particles can be included in the present mica pigment in amounts of between about 2% and about 60% by weight, or between about 10% and about 50% by weight, or between about 20% and about 40% by weight, based on the total weight of the microparticles produced by the present process. To produce such pigments, mica should be added to the first fluid mixture in amounts of between about 2% and about 60% by weight, or between about 10% and about 50% by weight, or between about 20% and about 40% by weight, based on the total weight of the polyester in the first fluid mixture. The mica, polyester, and stabilizer components at this stage can be combined in amounts ranging (in parts per hundred) from 2-60 parts mica, 50-90 parts polyester, and 8-25 parts stabilizer. In one embodiment, for example, the ratios of mica/polyester/stabilizer can be 11:73:16 parts per hundred.

The mica particles, polyester, polymeric stabilizer and water-miscible organic solvent should be heated to a temperature at which the polyester and polymeric stabilizer components are dissolved into the organic solvent to form a first fluid mixture, if a temperature above ambient temperature is required for this. The components of the fluid mixture can be heated after being combined, or alternatively one or more of the components can be heated before being combined with other components of the first fluid mixture. The first fluid mixture can be heated, for example, to a temperature of between about 40° C. and about 90° C., or between about 70° C. and about 80° C.

Following the creation of the first fluid mixture, a polar solvent (antisolvent) is added the first fluid mixture in order to form a second fluid mixture. The antisolvent is preferably added in a metered fashion, i.e. in controlled amounts over a predetermined time. For example, the antisolvent can be added in dropwise fashion to the first fluid mixture. Antisolvent can be added to the first fluid mixture, for example, at rates of 0.5-20 g/min., 1-15 g/min., or 3-10 g/min., for time periods of between 30-120 minutes, 45-90 minutes, or 60-75 minutes. When antisolvent is added at a faster rate, the supersaturation level is higher and smaller particles are formed, while adding antisolvent at a slower rate generally leads to larger particles. Homogeneous mixing also influences the degree of supersaturation of the second fluid mixture, which impacts the nucleation and particle growth rate.

The second fluid mixture is preferably stirred, agitated, or otherwise being mixed during addition of the antisolvent. In one embodiment, the first fluid mixture is heated prior to and/or during the addition of the antisolvent for example, to a temperature of between about 75° C. and about 95° C., or between about 80° C. and about 90° C. The second fluid mixture can be maintained at such a temperature for a predetermined period of time, for example for between about 15 minutes and about 4 hours following the initiation of antisolvent addition to the first fluid mixture, or for between about 30 minutes and about 2 hours, or for between about 45 minutes and about 1 hour. Following such heating, the second fluid mixture can be allowed to cool, in order to facilitate precipitation.

A nucleating agent can also be added to the in-process liquid mixture in order to facilitate precipitation of the mica pigment product of the present process. The nucleating agent can be added before the addition of the antisolvent, after the addition of the antisolvent, or contemporaneously with the antisolvent. An example of such a nucleating agent is colloidal silica, which can be added after or together with the addition of the antisolvent. Other nucleating agents that can be used include minerals such as chalk, clay, kaolin, talc and silicates, and pigments such as cadmium red, cobalt yellow, then chromium oxide, titanium dioxide, magnesium oxide, carbonates, sulfates, carbon black, salts of carboxylic acids, benzophenone, and some polymers and other organic liquids. Other nucleating agents that can be used include molybdenum disulfide, iron sulfide, titanium dioxide, talc and sodium phenylphosphinate, sodium benzoate boron nitride, aromatic carboxylic acid salts, sodium benzoate, talc and some pigment colorants. Newer nucleating agents that can be used include phosphate ester salts and hyper nucle-ating agents having faster processing speeds.

In one embodiment, colloidal silica in water is added to the first fluid mixture to pre-nucleate or "pre-seed" the first fluid mixture. In another embodiment, the nucleating agent can be included in the antisolvent. For example, an antisolvent containing up to about 30% by weight colloidal silica can be added to the second fluid mixture. Nucleation affects the reaction speed and the microparticle size and distribution.

Following the addition of antisolvent to the first fluid mixture, a precipitate comprising the present mica pigment is formed in the second fluid mixture. The particles of this precipitate are separated from the second fluid mixture in ways known to the art, such as by centrifugation. The separated particles can be washed and further centrifuged in order to prepare the final mica pigment, and/or the particles can be subjected to freeze drying in order to prepare the mica pigment.

Spherical particles comprising mica such as those produced by the present process were not previously known for use in powder coating applications. The solvent/antisolvent system of the present method allows better control over the properties of such particles, which can be smaller and more spherical than current mica-containing particles. The final product can be altered by changes to the degree of loading of polymer to pigment, leading to pigment particles of different colors and lusters.

Mica Pigments for Powder Coating Applications

Figure 6:
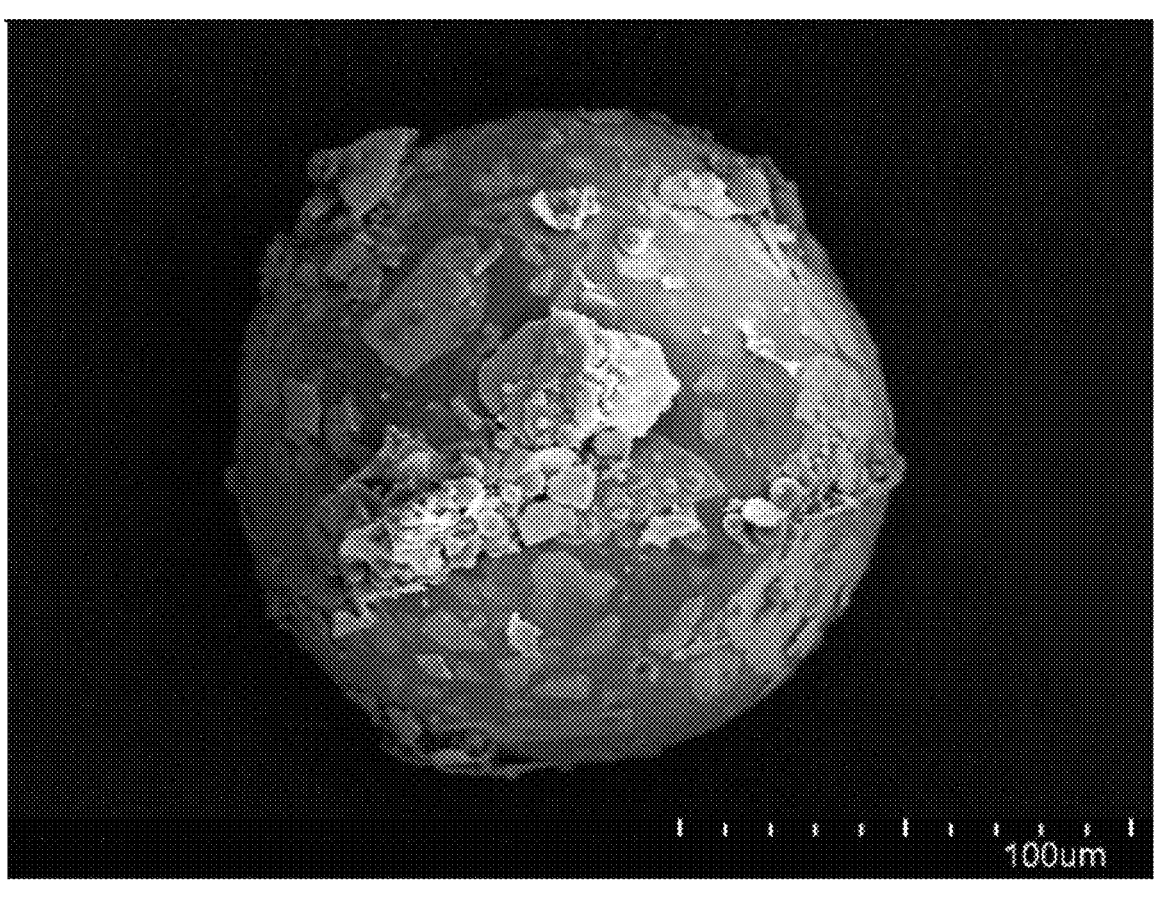
FIG. 6 is a further scanning electron microscope image of the sample analyzed in FIG. 2 at higher resolution than the image of FIG. 5.

The present mica pigment generally comprises flakes of mica incorporated within and on the surface of polymeric particles. As best seen in FIG. 6, flat, lamellar layers of metal oxide-coated mica adhere to the surface of a generally spherical polymer material. The particle is formed by pre-cipitation of the polymer material in solution, and as the precipitate is formed the mica is incorporated within the precipitating particles as well as becoming adhered to the surface of such particles.

An advantageous characteristic of the particles of the present mica pigment is that they are generally spherical, despite incorporating a sheet-like material such as mica. This can be seen for example in FIGS. 4-6, which are SEM micrographs of samples of the present mica pigment composition, which show a collection of spherical particles. Greater sphericity provides improved flow characteristics to the present mica-containing pigment composition and facilitates the application of the composition by an electrostatic powder coating applicator, for example.

The spherical nature of the particles of the present mica pigment can be measured by their circularity. These particles can have a circularity of between about 0.93 and about 0.999, between about 0.95 and about 0.995, or between about 0.96 and about 0.990, for example. Circularity can be determined for example with a Sysmex FPIA-3000 Particle Characterization System or a Sysmex FPIA-2100 Flow Particle Image Analyzer, both available from Malvern Instruments Ltd. (Worcestershire, UK). In flow particle image analysis, a sample is taken from a dilute suspension of particles, and this suspension is then passed through a measurement cell where images of the particles are captured, such as with stroboscopic illumination and a CCD camera. A digital image of each particle is extracted and quantified, such as by identifying particle pixels from background pixels using differences in greyscale levels ("thresholding") and by tracing the perimeters of individual particles and calculating their areas by edge definition.

The particles of the present mica-containing pigment composition also advantageously have a narrow particle size distribution (geometric standard deviation), such as a GSD of between about 1.3 and about 2.0. The size of such pigment particles can be determined by a photographic method, such as through the use of a Particle Image Analyzer as described above, and the GSD can then be calculated using methods known to the art based on such size data. One way to express distribution width is as the span, which can be expressed by the following formula:

$$\text{Span} = \frac{D_{v0.9} - D_{v0.1}}{D_{v0.5}}$$

The parameter Dv0.9 [or Dv(90)] signifies the point in the size distribution, up to and including which, 90% of the total volume of material in the sample is contained.

A narrow size distribution is better for evenly dispersing the pigment from an electrostatic applicator onto a substrate and creating a thin layer of the pigment on the substrate surface. An example of the narrow size distribution of the present pigment particles can be seen for example in FIGS. 2 and 3, which display the sizes of particles of two samples of the present mica-containing pigment composition.

The average particle size of particles of the present mica-containing pigment composition can also be calculated from the size data described above. The average size of the particles comprising the present pigment will vary, depending in part on the size of the mica particles used to form the pigment, but can be for example between about 50 microns and about 250 microns, between about 100 microns and about 200 microns, or between about 125 microns and about 175 microns. The average particle size can be the D50, i.e. the size at which half of the particles are larger and half smaller, and can be determined using a Multisizer 3 Coulter Counter made by Beckman Coulter (Indianapolis, IN), for example.

The aspect ratio of particles produced by the present process is preferably in the range of about 1. Preferably, the particles have an aspect ratio of between about 0.93 and about 0.999, between about 0.95 and about 0.995, or between about 0.96 and about 0.990. The average of the aspect ratios of the particles is also preferably between about 0.93 and about 0.999, between about 0.95 and about 0.995, or between about 0.96 and about 0.990. The minimum size of the present pigment particles is limited by the size of the mica particles used in the present process, as particles can generally only be as small as the aspect ratio of the mica particles being used. The diameter of the mica particles used in the present process is generally between 5 and 200 µm and the thickness showing a dimension below 1 µm, so the aspect ratio can therefore in some cases reach values of up to 200.

The present pigment particles can impart a variety of gloss finishes to a substrate surface. Gloss can be measured with a glossmeter, as known to those of skill in the art, for example at angles of 20°, 45°, 60°, 75°, or 85°. The present pigments can have glosses in the range of from about 10 GU to about 70 GU, from about 20 GU to about 60 GU, or from about 30 to about 50 GU, for example.

The ability to make such spherical and narrowly distributed particles can reduce material use rates, provide better material flow during application, and provide a more consistent powder coating thickness on a substrate. Power production costs are also reduced compared to the current bonding techniques, which use energy heat polymers such as polyester to their softening point. Mica-containing particles have improved mechanical properties and increased dimensional stability, stiffness, and strength. Mica-reinforced plastics also have high-heat dimensional stability, reduced warpage, and used as a mold release compound. Mica also reduces gas permeation and improves resiliency.

Application of Mica Pigments

The present mica-containing pigment composition can be applied as a decorative coating to a variety of articles and surfaces, such as to appliances, auto parts, consumer electronics, furniture, bicycles, and heavy duty equipment. As discussed above, mica particles can have a variety of colors and reflectance levels, and the present mica pigments thus impart such qualities to substrates on which the present mica pigment is applied. The applied coating provides a decorative appearance due to its optical properties (interference color) as well as providing a textured appearance.

The present mica-containing pigment composition is a powder coating which is preferably applied to a substrate by electrostatic spraying with an electrostatic applicator device. Such devices can make use of tribo or corona charging. During corona charging, a high voltage potential is developed at an electrode located in or near a stream of powder comprising the present pigment composition. The powder particles become negatively charged and are attracted to the grounded substrate. Alternatively, substrates can be coated with the present pigment composition using a fluidized bed, by passing the substrate through an electrically charged cloud of powder comprising the present mica-containing pigment composition.

The present mica-containing pigment composition can be applied in a variety of thicknesses, depending on the particular application for the coating. In applications for items expected to experience significant wear and tear or harsher environmental conditions, coatings can be applied in greater thicknesses, while decorative coatings can be thinner. Decorative coatings are typically applied in thickness of, for example, 0.025 mm to 0.10 mm, such as in thicknesses of from 1.5 to 3.5 mils (0.038 mm-0.089 mm) or between 2.5 and 3 mils (0.064 mm-0.076 mm) (with 1 mil=0.0254 mm). Coatings which need to be more protective can be thicker, such as from 0.25 mm to 0.76 mm.

Following the application of a layer of the present mica-containing pigment composition to a substrate, the applied coating layer is heat-cured, for example at a temperature of between about 90° C. and about 180° C., or between about 100° C. and about 130° C.

EXAMPLES

Example 1: Preparation of Mica-Containing Pigment

A gold-colored mica material was obtained from Black Diamond Pigments. The mica used in the following processes was made up of mainly $TiO_2$, while the core mica itself was mainly silica and magnesium, as well as $SiO_2$. The elemental composition was as follows:

| Element | O | F | Mg | Al | Si | K | Ti | Pd | Pt |
|---|---|---|---|---|---|---|---|---|---|
| Wt-% | 27.02 | 4.13 | 13.17 | 5.43 | 18.97 | 9.96 | 11.36 | 2.55 | 7.38 |

Two sets of polyester microparticles were formulated with the gold mica pigment. One batch ("Batch 1") used both high molecular weight (50-55K) and low molecular weight (18-20K) amorphous polyesters (1:1), while a second batch ("Batch 2") included only high molecular weight polyester. The colloidal silica (Si) used in these experiments was a 30 wt. % suspension in water, called LUDOX® AM (available from W. R. Grace and Company, Columbia, Maryland). The loading of Si for these experiments was relatively high, about 10-20%, but after washing and drying of the final product the amount of Si detected was low. In Batch 1, the silica was added after the antisolvent stage solution and for Batch 2 a portion of silica was added with organic phase/polyester while the remaining amount was mixed with the antisolvent solution and added by a metering pump (available from Fluid Metering, Inc.).

Into a 1 L, three-necked round bottom flask, 65.7 g of polyester resin was added together with 10.4 g Venetian Gold Mica pigment and 13.8 g of polyvinyl alcohol (PVA, 78K) in dimethyl acetamide (DMAc, 370.2 g, water-miscible, high boiling solvent). Mixing at about 420 rpm was started in order to start dissolving the polymers. While still at ambient temperature (23° C.) 42.0 g colloidal silica (30 wt. % solution, 12.6 g Si) was added to help "pre-seed" the organic phase before starting the antisolvent addition. The polymer solution was heated up to 90° C. and a solution of PVA/Si in deionized water (4.06 g 78K PVA in 224.9 g DIW as antisolvent, with 69.9 g of 30 wt. % colloidal Si) was added dropwise to the flask with the metering pump while stirring at 640 RPM. After about 10 minutes of adding the aqueous PVA solution, the solvent solution went from clear light yellow to a white opaque. The aqueous PVP/Si solution was added for about 75 minutes, and the heating was stopped within 30 minutes. The opaque solution was left to cool and left stirring overnight at 370 RPM. The next day, the solution was transferred to a 1 L centrifuge bottle and centrifuged at 3000 RPM for 15 minutes to remove the DMAc/DIW mixture. The particles were resuspended in DIW and mixed by shaking for about 30 seconds before centrifuging them again at 3000 RPM for 15 minutes. This wash/centrifuge procedure was repeated one more time before concentrating the particles and transferring them to a freeze-drier bottle. The particle slurry was rapidly frozen and then placed in a freeze drier which subjected the bottled particles to a high vacuum that removed ice by sublimation.

Figure 2:
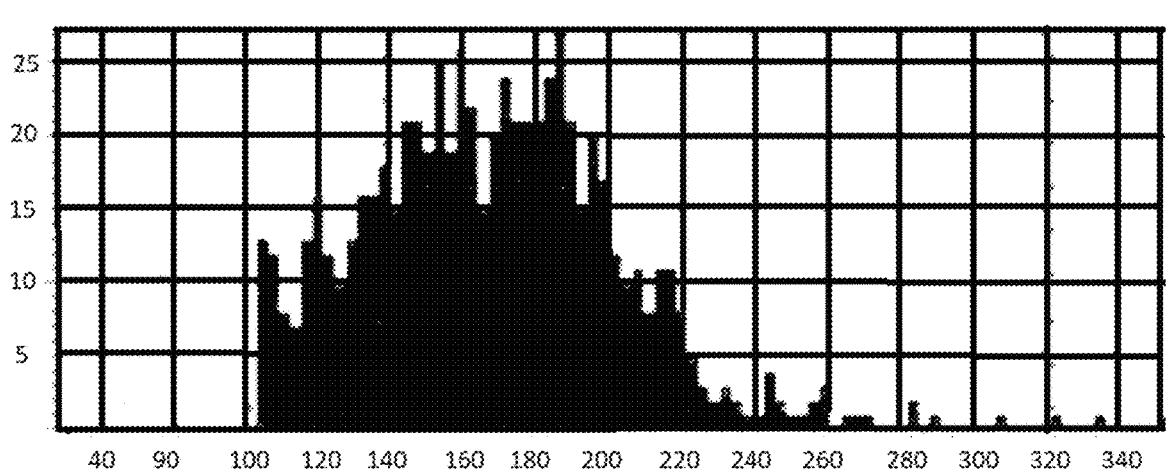
FIG. 2 is a bar graph showing a digital microscopy image analysis of a sample of the present pigment composition (Batch 1).
Figure 3:
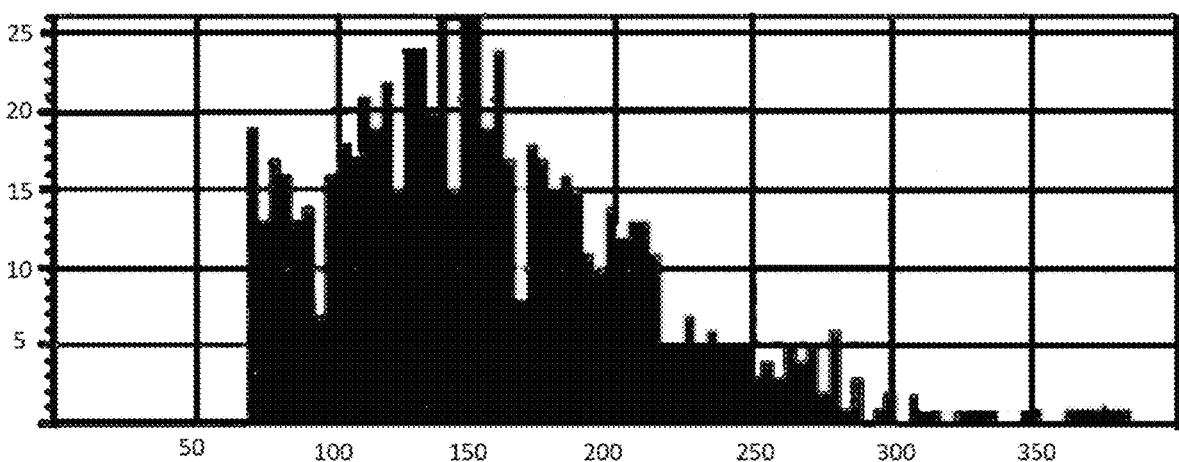
FIG. 3 is a bar graph showing a digital microscopy image analysis of another sample of the present pigment composition (Batch 2).
Figure 4:
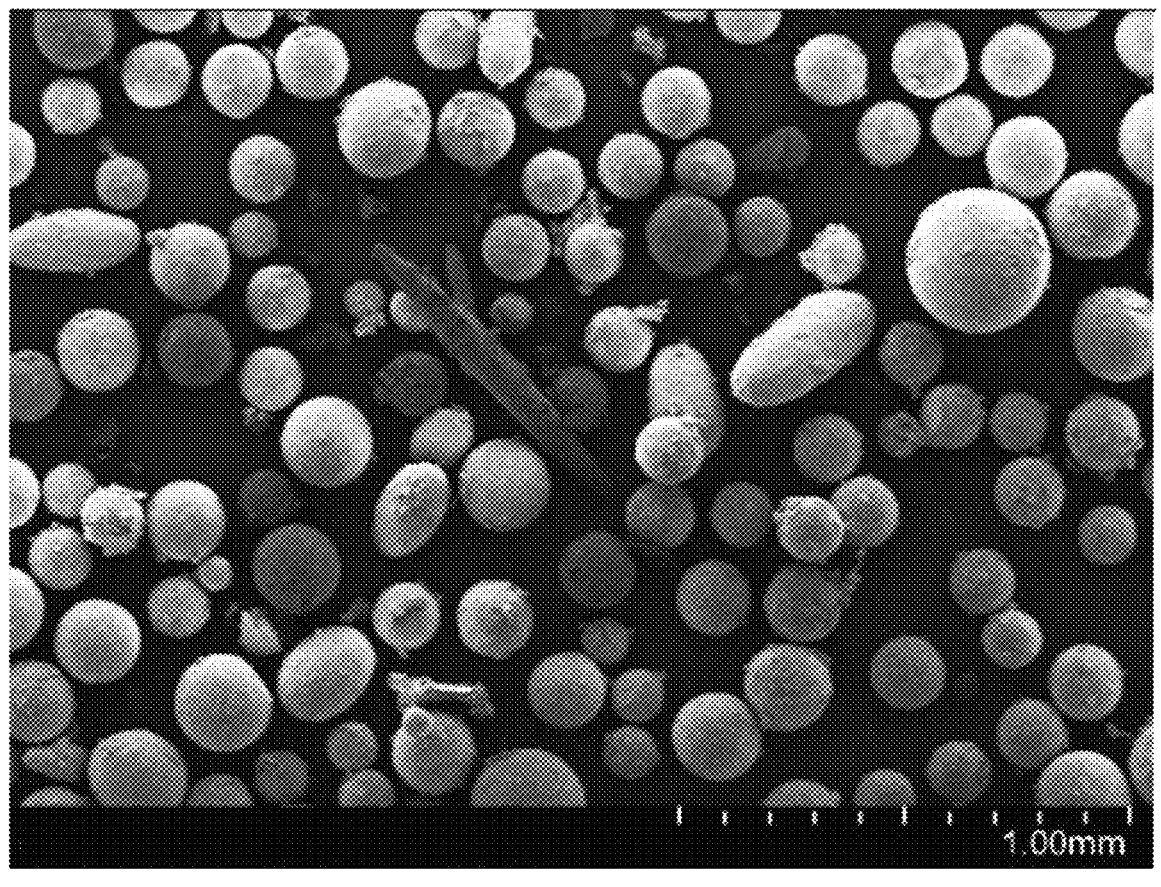
FIG. 4 is a scanning electron microscope (SEM) image (micrograph) of the sample analyzed in FIG. 2 (Batch 1).
Figure 5:
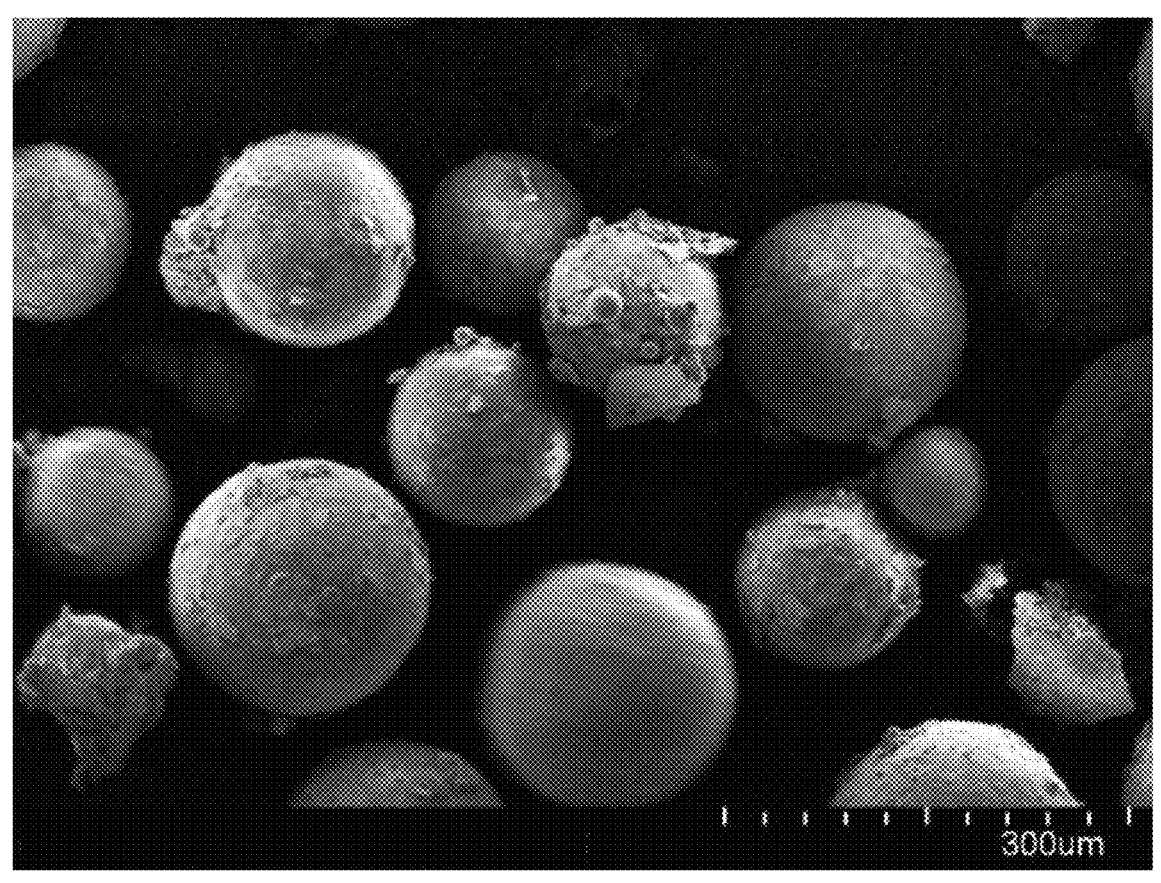
FIG. 5 is another scanning electron microscope image of the sample analyzed in FIG. 2 at higher resolution than the image of FIG. 4.

The particles were submitted for thermogravimetric analysis, gel permeation chromatography (GPC) and inductively coupled plasma (ICP) spectrometry. Digital microscopy and SEM were also used to characterize the particle shape, surface structure, particle size and particle size distribution. FIG. 2 shows size data gathered from image analysis of Batch 1, while FIG. 3 shows size data gathered from image analysis of Batch 2. FIGS. 4-6 are SEM images of particles of batch Batch 1. The SEM images clearly show the presence of gold mica pigment on the surface of the spherical particles.

Example 2: Properties of Mica Pigment

Properties of the mica-containing pigment composition produced in Example 1 are listed in Table 1 below.

TABLE 1

| Particle Formulation | Batch 1 | Batch 2 |
|---|---|---|
| Ratio of low to high molecular weight polyester | 1:1 | 0:1 |

US 12,655,306 B2

15

TABLE 1-continued

| Particle Formulation | Batch 1 | Batch 2 |
|---|---|---|
| Pigment Color | Gold | Gold |
| % Mica added | 23% | 28% |
| Particle size range | 168 ± 36 µm | 158 ± 60 µm |

The size distribution of particles produced in Example 1 is shown in FIGS. 2 and 3. FIG. 2 is a bar graph showing a digital microscopy image analysis of Batch 1, while FIG. 3 is a bar graph showing a digital microscopy image analysis of Batch 2.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

It will be appreciated that variants of the above-disclosed and other features and functions, or alternatives thereof, can be combined into many other different systems or applications. Various presently unforeseen or unanticipated alternatives, modifications, variations, or improvements therein can be subsequently made by those skilled in the art which are also intended to be encompassed by the following claims.

What is claimed is:

1. A mica-containing pigment composition, comprising: spherical pigment particles having glosses in a range of about 10 GU (Gloss Unit) to 70 GU, wherein the glosses reflect light in a specular direction, the pigment particles comprising a polymer material with mica flakes incorporated therein and thereon, the mica flakes comprising mica particles, wherein a diameter of the mica particles is between 5 µm and 200 µm and a thickness with a dimension below 1 µm, wherein the spherical pigment particles of the composition have a circularity of between about 0.93 and about 0.999 and a particle size distribution of between about 1.3 and about 2.0, wherein the circularity refers to a circumference of a circle of an equivalent area divided by an actual perimeter of a central cross-section of a particle, wherein a polyester is used in a production of the mica-containing pigment composition, the polyester comprising a polyester resin, wherein the polymer material comprises a water-soluble polymer that comprises a polymeric stabilizer used for the production of the mica-containing pigment composition, the polymeric stabilizer initially combined with the mica particles and the polyester resin as a part of the production of the mica-containing pigment composition, wherein the polyester resin and the polymeric stabilizer are then dissolved into a water-miscible organic solvent with the mica particles to form a fluid mixture that includes the mica particles, wherein a polar solvent is then added to the fluid mixture at a predetermined rate, wherein pigment particles then precipitate from the fluid mixture as a part of the production of the mica-containing pigment composition and wherein the polar solvent is used as an antisolvent to induce precipitation of mica pigment comprising the mica particles from the fluid mixture.

2. The pigment composition of claim 1, wherein the spherical pigment particles have a circularity of between about 0.95 and about 0.995 and wherein the pigment composition comprises a powder coating applicable to a substrate via a fluidized bed by passing the substrate through an electrical charged cloud of the powder.

3. The pigment composition of claim 2, wherein the mica is present in the particles in an amount of between about 2% and about 60% by weight of the spherical pigment particles.

4. The pigment composition of claim 2, wherein the average particle size of the mica of the mica flakes is between about 5 microns and about 150 microns.

5. The pigment composition of claim 2, wherein the composition has a metallic color.

6. The pigment composition of claim 1, wherein the average particle size of the spherical pigment particles is between about 50 microns and about 250 microns.

7. The pigment composition of claim 1, wherein the mica of the mica flakes comprises a lamellar, metal-hydrate silicate/aluminosilicate mineral coatable with an oxide of a transition metal.

* * * * *